United States Patent
Tsutsumi et al.

(10) Patent No.: US 10,738,203 B2
(45) Date of Patent: Aug. 11, 2020

(54) CURING ACCELERATOR FOR OXIDATIVELY POLYMERIZABLE UNSATURATED RESIN, PRINTING INK AND COATING MATERIAL

(71) Applicant: DIC Corporation, Tokyo (JP)

(72) Inventors: Hiroshi Tsutsumi, Ichihara (JP);
Akinori Takahashi, Ichihara (JP);
Hiroaki Nakano, Ichihara (JP);
Takayuki Odashima, Ichihara (JP);
Ichiro Azuma, Ichihara (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 15/752,746

(22) PCT Filed: Sep. 1, 2016

(86) PCT No.: PCT/JP2016/075625
§ 371 (c)(1),
(2) Date: Feb. 14, 2018

(87) PCT Pub. No.: WO2017/043406
PCT Pub. Date: Mar. 16, 2017

(65) Prior Publication Data
US 2018/0237645 A1  Aug. 23, 2018

(30) Foreign Application Priority Data
Sep. 8, 2015  (JP) .................... 2015-176671

(51) Int. Cl.
| | | |
|---|---|---|
| *C09D 7/63* | (2018.01) | |
| *C09D 201/02* | (2006.01) | |
| *C09D 11/105* | (2014.01) | |
| *C09D 11/03* | (2014.01) | |
| *C09D 11/106* | (2014.01) | |
| *C09D 201/06* | (2006.01) | |
| *C08K 5/00* | (2006.01) | |
| *C08F 4/70* | (2006.01) | |
| *C08K 5/098* | (2006.01) | |
| *C08K 5/3465* | (2006.01) | |

(52) U.S. Cl.
CPC .............. *C09D 7/63* (2018.01); *C09D 11/03* (2013.01); *C09D 11/105* (2013.01); *C09D 11/106* (2013.01); *C09D 201/02* (2013.01); *C09D 201/06* (2013.01); *C08F 4/7081* (2013.01); *C08K 5/0025* (2013.01); *C08K 5/0091* (2013.01); *C08K 5/098* (2013.01); *C08K 5/3465* (2013.01)

(58) Field of Classification Search
CPC ...... C09D 7/63; C09D 201/06; C09D 11/106; C09D 7/40; C09D 201/02; C09D 11/10; C09D 11/03; C09D 11/105; C09D 11/101; C08F 4/26; C08F 4/02; C08F 4/7081; C08K 5/0091; C08K 5/0025; C08K 5/3465; C08K 5/098
See application file for complete search history.

(56) References Cited

U.S. PATENT DOCUMENTS

| | | | |
|---|---|---|---|
| 2,565,897 A | 8/1951 | Wheeler | |
| 4,680,058 A * | 7/1987 | Shimizu | C09D 11/36 101/45 |
| 5,141,562 A * | 8/1992 | Cells | C09D 11/03 106/287.19 |

(Continued)

FOREIGN PATENT DOCUMENTS

| | | |
|---|---|---|
| EP | 1114836 B1 | 7/2001 |
| EP | 2548929 A1 | 1/2013 |

(Continued)

OTHER PUBLICATIONS

Al-Busafi et al, 8-Hydroxyquinoline and its Derivatives: Synthesis and Applications, Research & Reviews: Journal of Chemisty, vol. 3, Issues 1, Jan.-Mar. 2014, pp. 1-10.*
Polymer Properties Database, Alkyd Resins, pp. 1-2.*
International Search Report dated Oct. 18, 2016, issued for PCT/JP2016/075625.
Office Action issued in corresponding Taiwanese Patent Application No. 10821079140, dated Nov. 15, 2019.

*Primary Examiner* — Alexander C Kollias
(74) *Attorney, Agent, or Firm* — Locke Lord LLP; James E. Armstrong, IV; Nicholas J. DiCeglie, Jr.

(57) ABSTRACT

To provide a curing accelerator for an oxidatively polymerizable unsaturated resin which can decrease the amount of cobalt metal soap used and has curing performance equal to or higher than excellent curing performance of the cobalt metal soap, and a printing ink and a coating material using the same. A curing accelerator for an oxidatively polymerizable unsaturated resin including a manganese or cobalt complex (α) containing quinolinol compound ions represented by Structural Formula (1) as a ligand, and a printing ink and a coating material including the curing accelerator.

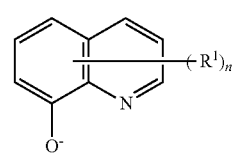

(1)

In the formula, $R^1$ is any of a hydrogen atom, a hydrocarbon group having 1 to 6 carbon atoms, an alkoxy group having 1 to 6 carbon atoms, a hydroxyl group, an amino group, a nitro group, a nitroso group, a sulfo group, and a halogen atom, and n is an integer of 1 to 6.

3 Claims, 1 Drawing Sheet

(56) References Cited

U.S. PATENT DOCUMENTS

| | | | |
|---|---|---|---|
| 2003/0054103 A1* | 3/2003 | Sato | C08F 257/02 |
| | | | 427/256 |
| 2003/0083199 A1* | 5/2003 | Arndt | A61B 5/1172 |
| | | | 503/201 |
| 2007/0072968 A1* | 3/2007 | Musa | C08K 5/0091 |
| | | | 524/100 |
| 2010/0221507 A1* | 9/2010 | Morimoto | C09D 11/101 |
| | | | 428/195.1 |
| 2014/0323646 A1* | 10/2014 | Matsunaga | C08F 242/00 |
| | | | 524/543 |

FOREIGN PATENT DOCUMENTS

| | | | | |
|---|---|---|---|---|
| JP | S4731960 U | 12/1972 | | |
| JP | S5632523 A | 4/1981 | | |
| JP | 06-172689 A | 6/1994 | | |
| WO | 2001/000702 A1 | 1/2001 | | |
| WO | 2011/158694 A1 | 12/2011 | | |
| WO | 2013/077267 A1 | 5/2013 | | |
| WO | WO-2013077267 * | 5/2013 | | C08L 10/00 |
| WO | 2013/084823 A1 | 6/2013 | | |
| WO | 2013/084824 A1 | 6/2013 | | |

* cited by examiner

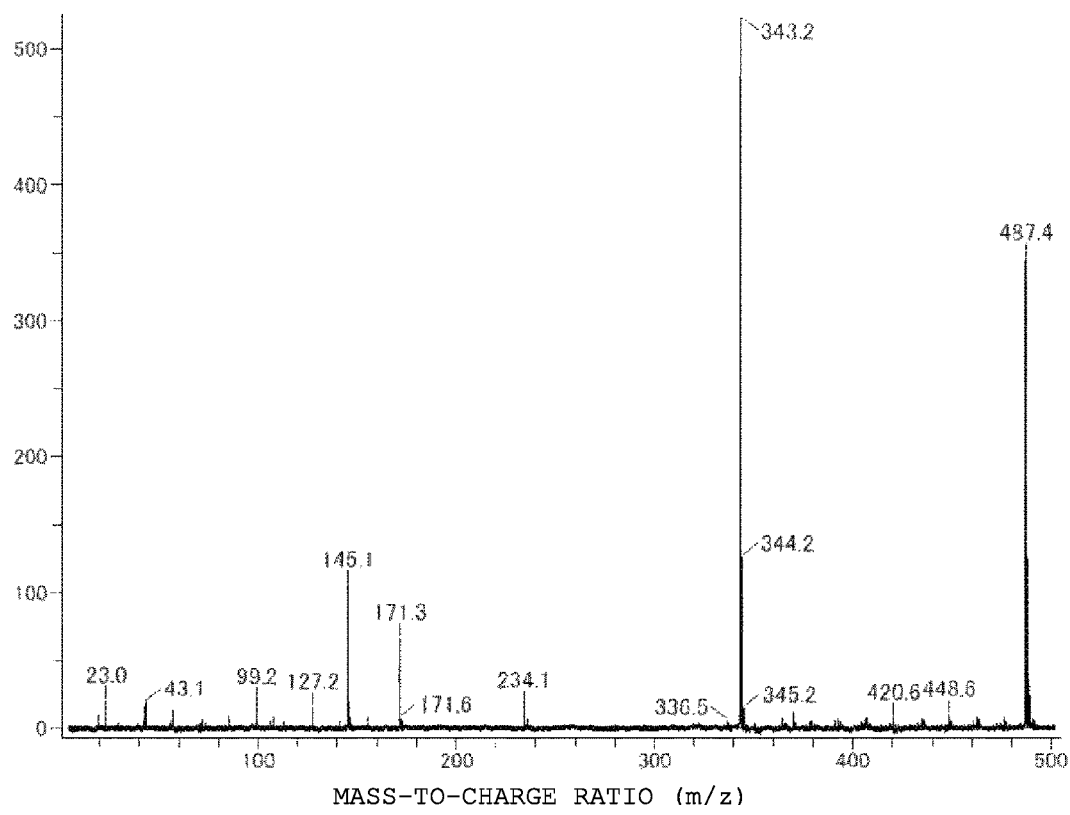

CURING ACCELERATOR FOR OXIDATIVELY POLYMERIZABLE UNSATURATED RESIN, PRINTING INK AND COATING MATERIAL

TECHNICAL FIELD

The present invention relates to a curing accelerator for an oxidatively polymerizable unsaturated resin having high curing accelerating properties, and a printing ink and a coating material using the same.

BACKGROUND ART

In a field using an oxidatively polymerizable resin as a structural component, such as a printing ink and a coating material, a drier is added as a curing accelerator for drying the resin. As the drier used in the ink or the coating material, a metal salt of a heavy metal such as cobalt, manganese, lead, iron, or zinc and various carboxylic acids (hereinafter, may be abbreviated as "metal soap") is generally used.

Particularly, a cobalt metal soap has excellent drying performance, however, in a case where a large amount thereof is used for obtaining higher drying performance, surface drying of an ink or a coating film may extremely rapidly proceed, and thus, the cobalt metal soap may be a reason of wrinkles or shrinkage. Therefore, as a method of obtaining high drying performance while preventing such wrinkles or shrinkage, a curing accelerator containing both of a cobalt metal soap and bipyridyl has been proposed (for example, see PTL 1). This curing accelerator prevented wrinkles or shrinkage and had high drying performance.

However, cobalt compounds are listed up in Group 2B of "possibly carcinogenic to humans" in the carcinogenicity risk list by the International Agency for Research on Cancer, and accordingly, carcinogenicity of the cobalt compounds is concerned. In addition, metal cobalt is a rare metal and supplying thereof is unstable, and accordingly, the price of the cobalt metal soap is high. Therefore, a curing accelerator having high drying performance in which no cobalt soap is used or a decreased amount of the cobalt metal soap is used is required.

As a method of preventing wrinkles or shrinkage without using the cobalt metal soap, a drying accelerator (curing accelerator) containing both of a manganese metal soap and bipyridyl is already proposed, before the curing accelerator is disclosed in PTL 1 (for example, see PTL 2). However, although the drying accelerator disclosed in PTL 2 is advantageous in that no cobalt metal soap is used, a drying time is increased in a case of being used as a curing accelerator of a printing ink or a coating material.

As a curing accelerator usable with a practical drying time, a use of both fatty acid manganese salt and specific amino alcohol has been proposed (for example, see PTLs 3 to 6), but curing properties comparable to those of the cobalt metal soap have not been obtained yet.

Meanwhile, as a curing catalyst of an oxidatively polymerizable compound including vegetable oil, a method of using a complex formed of a specific quadridentate ligand compound and metal has been proposed (for example, see PTL 7), and the vegetable oil is limited to a material containing 50% or more of phenol compounds such as anacardic acid, anagiganic acid, perranjic acid, ginkgotic acid, ginkgolinic acid, cardanol, cardol, methyl cardol, urushiol, thitsiol, renghol, and laccol, such as cashew nut shell liquid obtained from cashew trees. That is, a curing reaction using this complex occurs with a radical coupling reaction of a phenoxy radical generated due to dehydrogenation of a phenol compound, and accordingly, the complex cannot be used in a system including no phenol-based compounds. In addition, this complex has poor solubility in organic solvents, and thus, it is difficult to use the complex for compositions for general inks or coating materials. The complex is supposed to be formed in a system to cause a curing reaction, but it is necessary to use a material which is hard to handle outdoors, such as hydrogen peroxide water or ethylenediamine in the system, thereby causing poor versatility as well.

CITATION LIST

Patent Literature

[PTL 1] JP-A-06-172689
[PTL 2] U.S. Pat. No. 2,565,897
[PTL 3] Pamphlet of International Publication No. 2011/158694
[PTL 4] Pamphlet of International Publication No. 2013/077267
[PTL 5] Pamphlet of International Publication No. 2013/084823
[PTL 6] Pamphlet of International Publication No. 2013/084824
[PTL 7] Pamphlet of International Publication No. 2001/000702

SUMMARY OF INVENTION

Technical Problem

An object of the invention is to provide a curing accelerator for an oxidatively polymerizable unsaturated resin having curing performance equal to or higher than excellent curing performance of cobalt metal soap, having high solubility in organic solvents, being usable outdoors, and having excellent versatility, without using the cobalt metal soap which may affect a human body, or by using a small amount thereof compared to that in the related art, and a printing ink and a coating material using the same.

Solution to Problem

As a result of intensive studies, the inventors have found that it is possible to solve the aforementioned problems by a metal complex in which manganese or cobalt is used as a central metal and a compound including a quinolinol skeleton is used as a ligand, and the invention has been completed.

That is, the invention provides a curing accelerator for an oxidatively polymerizable unsaturated resin including a manganese or cobalt complex (α) containing quinolinol compound ions represented by Structural Formula (1) as a ligand.

[Chem. 1]

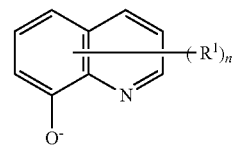

(1)

(In the formula, $R^1$ is any of a hydrogen atom, a hydrocarbon group having 1 to 6 carbon atoms, an alkoxy group having 1 to 6 carbon atoms, a hydroxyl group, an amino group, a nitro group, a nitroso group, a sulfo group, and a halogen atom, and n is an integer of 1 to 6.)

In addition, the invention provides a quinolinol compound (A) represented by Structural Formula (2), and a manganese salt or cobalt salt (B).

[Chem. 2]

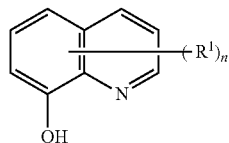

(2)

(In the formula, $R^1$ is any of a hydrogen atom, a hydrocarbon group having 1 to 6 carbon atoms, an alkoxy group having 1 to 6 carbon atoms, a hydroxyl group, an amino group, a nitro group, a nitroso group, a sulfo group, and a halogen atom, and n is an integer of 1 to 6.)

Further, the invention provides a printing ink and a coating material each including the curing accelerator for an oxidative polymerizable unsaturated resin and an oxidative polymerizable unsaturated resin.

Advantageous Effects of Invention

The curing accelerator for an oxidative polymerizable unsaturated resin of the invention solves problems regarding a concern about carcinogenicity of metal cobalt, unstable supplying of raw materials, and a high cost, and has a short curing time and excellent curing performance. In addition, the curing accelerator has excellent solubility in general organic solvents and also is usable outdoors, and thus, the curing accelerator can be suitably used as a curing accelerator of an oxidatively polymerizable drying type printing ink represented by lithographic inks or a coating material.

BRIEF DESCRIPTION OF DRAWING

FIG. 1 is an MS spectrum of a curing accelerator for an oxidatively polymerizable unsaturated resin (6) obtained in Example 6.

DESCRIPTION OF EMBODIMENTS

A curing accelerator for an oxidatively polymerizable unsaturated resin of the invention includes a manganese or cobalt complex (α) containing quinolinol compound ions represented by Structural Formula (1) as a ligand.

[Chem. 3]

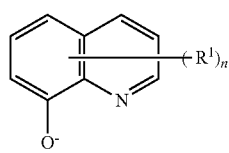

(1)

(In the formula, $R^1$ is any of a hydrogen atom, a hydrocarbon group having 1 to 6 carbon atoms, an alkoxy group having 1 to 6 carbon atoms, a hydroxyl group, an amino group, a nitro group, a nitroso group, a sulfo group, and a halogen atom, and n is an integer of 1 to 6.)

A curing accelerator for an oxidatively polymerizable unsaturated resin of the invention, for example, includes a component obtained by mixing a quinolinol compound (A) represented by Structural Formula (2), and a manganese salt or cobalt salt (B).

[Chem. 4]

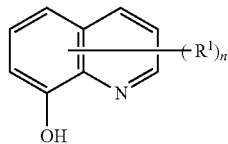

(2)

(In the formula, $R^1$ is any of a hydrogen atom, a hydrocarbon group having 1 to 6 carbon atoms, an alkoxy group having 1 to 6 carbon atoms, a hydroxyl group, an amino group, a nitro group, a nitroso group, a sulfo group, and a halogen atom, and n is an integer of 1 to 6.)

$R^1$ in Structural Formula (2) is any of a hydrogen atom, a hydrocarbon group having 1 to 6 carbon atoms, an alkoxy group having 1 to 6 carbon atoms, a hydroxyl group, an amino group, a nitro group, a nitroso group, a sulfo group, and a halogen atom, and the halogen atom is any of fluorine, chlorine, bromine, and iodine. Among these, from a viewpoint of excellent performance of the curing accelerator, a hydrogen atom or a halogen atom is preferable, and a chlorine atom is preferable as the halogen atom. In addition, in a case where $R^1$ is a chlorine atom, a value of n is preferably 1, and a structure in which a 5-position hydrogen atom on a quinolinol skeleton is substituted with a chlorine atom is preferable.

Accordingly, the quinolinol compound (A) represented by Structure Formula (2) is more preferably a compound having a molecular structure represented by Structure Formula (2-1) or (2-2).

[Chem. 5]

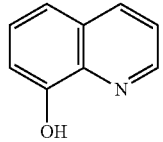

(2-1)

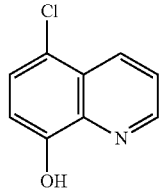

(2-2)

The manganese salt or cobalt salt (B) is not particularly limited, as long as it causes ligand exchange under the presence of the quinolinol compound (A) to form the manganese or cobalt complex (α) containing the quinolinol compound ions as a ligand, and examples thereof include components represented by any of General Formulae (B-1) and (B-2).

[Chem. 6]

[In the formulae, M is $Mn^{2+}$ or $Co^{2+}$, X is any of $F^-$, $Cl^-$, $Br^-$, $I^-$, $PF_6^-$, $SbF_6^-$, $AsF_6^-$, $BF_4^-$, $B(C_6F_5)_4^-$, $ClO_4^-$, $ClO_3^-$, $CO_2^-$, $ClO^-$, $H_2PO_4^-$, $H_2PO_3^-$, $H_2PO_2^-$, $HCO_3^-$, $NO_3^-$, $NO_2^-$, $(CH_3CO)_2CH^-$, and $RCOO^-$ (R is a hydrocarbon group having 1 to 22 carbon atoms), and Y is any of $O^{2-}$, $S^{2-}$, $SO_4^{2-}$, $SO_3^{2-}$, and $CO_3^{2-}$.] These may be used alone or in combination of two or more kinds thereof.

Among these, from a viewpoint of excellent solubility with respect to a printing ink or a coating material, X in General Formula (B-1) is preferably a fatty acid salt which is $RCOO^-$ (R is a hydrocarbon group having 1 to 22 carbon atoms), and particularly preferably any of octylate, neodecanoate, isononanoate, and naphthenate.

The manganese salt or cobalt salt (B) can be, for example, obtained by dissolving sodium salts and the like of anions which are counter ions in water, adding a manganese salt or a cobalt salt soluble in water thereto, causing an ion-exchange reaction which is called double decomposition, and performing water washing, dehydration, and filtering.

Regarding a mixing ratio of the quinolinol compound (A) and the manganese salt or cobalt salt (B), the amount of metal atoms in the manganese salt or cobalt salt (B) is preferably in a range of 0.1 to 20 mol, more preferably in a range of 0.2 to 10 mol, and particularly preferably in a range of 0.5 to 5 mol, with respect to 1 mol of the quinolinol compound (A), from a viewpoint of excellent performance of the curing accelerator.

For the mixing of the quinolinol compound (A) and the manganese salt or cobalt salt (B), for example, a method of mixing both components in a diluent such as an organic solvent or vegetable oil may be exemplified. The diluent preferably has excellent affinity with oxidatively polymerizable unsaturated resins, with respect to a case of being used for the printing ink or the coating material, and examples thereof include a hydrocarbon-based solvent such as toluene, xylene, heptane, hexane, or mineral spirit; an alcohol-based solvent such as methanol, ethanol, propanol, or cyclohexanol; a ketone-based solvent such as methyl ethyl ketone, methyl isobutyl ketone, or cyclohexanone; an ether-based solvent such as propyl ether, methyl cellosolve, cellosolve, butyl cellosolve, or methyl carbitol; vegetable fat and oil such as soybean oil, linseed oil, rapeseed oil, or safflower oil; and fatty acid ester represented by R—COOR' (in the formula, R is an alkyl group having 5 to 11 carbon atoms and R' is an alkyl group having 1 to 3 carbon atoms).

The fatty acid ester represented by R—COOR' is obtained by causing esterification of a carboxylic acid having 6 to 12 carbon atoms and an alcohol having 1 to 3 carbon atoms, and a carbon chain of the carboxylic acid and the alcohol may be linear or branched. Specific examples thereof include caproic acid methyl ester, enanthic acid methyl ester, caprylic acid methyl ester, pelargonic acid methyl ester, capric acid methyl ester, lauric acid methyl ester, caproic acid ethyl ester, enanthic acid ethyl ester, caprylic acid ethyl ester, pelargonic acid ethyl ester, capric acid ethyl ester, lauric acid ethyl ester, caproic acid propyl ester, enanthic acid propyl ester, caprylic acid propyl ester, pelargonic acid propyl ester, capric acid propyl ester, and lauric acid propyl ester.

These diluents may be used alone or in combination of two or more kinds thereof. Among these, from viewpoints of excellent uniformity at the time of being used as an ink or a coating material and excellent storage stability, vegetable oil, particularly soybean oil, or mineral spirit used in the printing ink or the coating material using the oxidatively polymerizable unsaturated resins is preferably used.

A valence of a central metal of the manganese or cobalt complex (α) obtained as described above is not particularly limited, as long as the manganese or cobalt complex (α) includes the quinolinol compound ions as a ligand. In a case where the central metal is manganese, divalent to heptavalent complexes are normally obtained. In addition, in a case where the central metal is cobalt, a divalent or trivalent complex is normally obtained.

In a case of preparing the curing accelerator for an oxidatively polymerizable unsaturated resin of the invention, the quinolinol compound (A) and ligands (A') other than the quinolinol compound (A) may be used in combination. Examples of the other ligands (A') include fatty acid represented by RCOOH (R is a hydrocarbon group having 1 to 22 carbon atoms) such as an octylic acid, a neodecanoic acid, an isononanoic acid, or a naphthenic acid, an amino alcohol compound, a 2,2'-bipyridyl compound, a 1,10-phenanthroline compound, a 1,4,7-trimethyl-1,4,7-thiazonane compound, and a compound represented by Structural Formula (A'-1). These may be used alone or in combination of two or more kinds thereof. In a case of using these other ligands (A'), 50 mol % or more of the quinolinol compound (A) is preferably used and 80 mol % or more thereof is more preferably used, with respect to the total of the quinolinol compound (A) and the other ligands (A').

[Chem. 7]

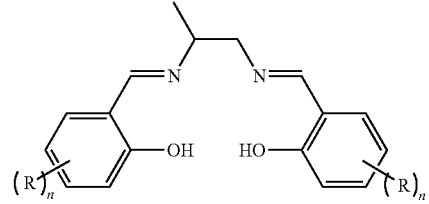

(R in the formula is any of a hydrogen atom, a hydrocarbon group having 1 to 6 carbon atoms, an alkoxy group having 1 to 6 carbon atoms, a hydroxyl group, an amino group, a nitro group, a nitroso group, a sulfo group, and a halogen atom, and n is an integer of 1 to 4.)

In a case of preparing the curing accelerator for an oxidatively polymerizable unsaturated resin of the invention, a metal salt (C) other than the manganese salt or cobalt salt (B) may be further included, in addition to the quinolinol compound (A) and the manganese salt or cobalt salt (B).

Examples of the other metal salt (C) include various metal salts such as bismuth, zirconium, barium, calcium, strontium, nickel, copper, zinc, cerium, vanadium, and iron. These other metal salts (C) may be used alone or in combination of two or more kinds thereof. Among these, from a viewpoint of excellent performance of the curing accelerator, any metal salt of bismuth, zirconium, barium, calcium, and strontium is preferable.

The anions which are counter ions of the metal salt (C) may be any of $F^-$, $Cl^-$, $Br^-$, $I^-$, $PF_6^-$, $SbF_6^-$, $AsF_6^-$, $BF_4^-$, $B(C_6F_5)_4^-$, $ClO_4^-$, $ClO_3^-$, $CO_2^-$, $ClO^-$, $H_2PO_4^-$, $H_2PO_3^-$, $H_2PO_2^-$, $HCO_3^-$, $NO_3^-$, $NO_2^-$, $(CH_3CO)_2CH^-$, and $RCOO^-$ (R is a hydrocarbon group having 1 to 22 carbon atoms), $O^{2-}$, $S^{2-}$, $SO_4^{2-}$, $SO_3^{2-}$, and $CO_3^{2-}$, in the same manner as for the manganese salt or cobalt salt (B). Among these, from a viewpoint of excellent performance of the curing accelerator, the counter ions are preferably a fatty acid salt which is RCOO⁻ (R is a hydrocarbon group having 1 to 22 carbon atoms). In addition, from a viewpoint of excellent solubility with respect to the printing ink or the coating material, a fatty acid salt in which R is a hydrocarbon group having 5 or more carbon atoms is more preferable. Examples of the fatty acid salt in which R is a hydrocarbon group having 5 or more carbon atoms include octylate, naphthenate, neodecanoate, isononanoate, tung oilate, linseed oilate, soybean oilate, resinate, and tall oil fatty acid salt of various metals.

In a case of using a metal salt of bismuth, zirconium or barium as the other metal salt (C), the amount of the metal used in the other metal salt (C) is preferably 1 to 100 parts by mass and more preferably 3 to 40 parts by mass, with respect to 1 part by mass of manganese or cobalt metal in the manganese salt or cobalt salt (B).

In a case of using metal salt of calcium or strontium as the other metal salt (C), the amount of the metal used in the other metal salt (C) is preferably 1 to 100 parts by mass with respect to 1 part by mass of manganese or cobalt metal in the manganese salt or cobalt salt (A).

For these other metal salts (C), a commercially available product can be used, or a metal salt can be prepared, if necessary. For example, the fatty acid metal salt can be prepared by a method of adding a hydrate, a hydroxide, a carbonate, and the like of a metal to a fatty acid and stirring the mixture under heating conditions to cause a reaction. A reaction temperature is normally 40° C. to 200° C. and preferably 80° C. to 150° C. In addition, a reaction time is normally 1 to 10 hours and preferably 1 to 5 hours. Regarding the ratio of the used amounts of the fatty acid and the metal atoms, the amount of fatty acid used is preferably in a range of 1.0 to 4.0 mol and more preferably 1.5 to 3.5 mol with respect to 1 mol of the metal atoms. As another method of preparing the fatty acid metal salt, a method of dissolving a fatty acid in water as a salt soluble in water such as sodium salt, adding a metal salt soluble in water thereto, causing an ion-exchange reaction which is called double decomposition, and performing water washing, dehydration, and filtering is used.

A curable resin composition of the invention may include the curing accelerator for an oxidatively polymerizable unsaturated resin and an oxidatively polymerizable unsaturated resin, as essential components, and organic solvents, various additives, and the like. The oxidatively polymerizable unsaturated resin used here includes an unsaturated bond in a molecular structure, and may be any resins, as long as the unsaturated bond can be oxidatively polymerized by oxygen in the air. Specifically, in a case of being used for the printing ink, a rosin-modified phenol resin, an unsaturated group-containing polyester resin, an alkyd resin, a petroleum resin, polymerized oil, and the like are used. In addition, in a case of being used for the coating material, an alkyd resin, an unsaturated group-containing urethane resin, an unsaturated group-containing epoxy resin, an unsaturated group-containing polyester resin, polymerized oil, and the like are used. These oxidatively polymerizable unsaturated resins may be used alone or in combination of two or more kinds thereof.

Examples of a method of preparing the curable resin composition of the invention include a method of mixing the quinolinol compound (A) and the manganese salt or cobalt salt (B) in advance to prepare the curing accelerator for an oxidatively polymerizable unsaturated resin, and mixing this with an oxidatively polymerizable unsaturated resin and other components, a method of mixing any one of the quinolinol compound (A) and the manganese salt or cobalt salt (B) with an oxidatively polymerizable unsaturated resin and other components in advance, and adding the other one of the quinolinol compound (A) and the manganese salt or cobalt salt (B) thereto, and a method of collectively mixing the quinolinol compound (A), the manganese salt or cobalt salt (B), the oxidatively polymerizable unsaturated resin, and other components with each other.

In addition, in a case of using the other metal salt (C) described as an arbitrary component of the curing accelerator for an oxidatively polymerizable unsaturated resin, the other metal salt may be mixed with the curable resin composition by a method other than the method of adding the other metal salt to the curing accelerator for an oxidatively polymerizable unsaturated resin obtained by mixing the quinolinol compound (A) and the manganese salt or cobalt salt (B) in advance. For example, a method of adding the other metal salt in a case of mixing the curing accelerator for an oxidatively polymerizable unsaturated resin and the oxidatively polymerizable unsaturated resin, or a method of mixing the other metal salt collectively with the quinolinol compound (A), the manganese salt or cobalt salt (B), and the oxidatively polymerizable unsaturated resin with each other, is used.

A case of using the curing accelerator for an oxidatively polymerizable unsaturated resin of the invention for the printing ink will be described. The printing ink includes a pigment or a dye, a gelling agent, a surface modifier, a drying inhibitor, vegetable oil, various organic solvents, and the like, in addition to the curing accelerator for an oxidatively polymerizable unsaturated resin and the oxidatively polymerizable unsaturated resin. A mixing ratio of each component or the kind of mixtures is suitably adjusted depending on a printing system. The curing accelerator for an oxidatively polymerizable unsaturated resin of the invention can also be suitably used in a printing ink of any system such as a lithographic offset ink, a waterless lithographic ink, and a letterpress ink.

The amount of the curing accelerator for an oxidatively polymerizable unsaturated resin mixed in the printing ink is preferably in a range of 0.001 to 5 parts by mass in 100 parts by mass of the printing ink, from viewpoints of realizing an ink which has a short drying time and of which skinning hardly occurs.

For the pigment, organic pigments for a printing ink disclosed in "Organic Pigment Handbook (writer: Isao Hashimoto, Publisher: Color Office, 2006, the first edition" is used, for example, and a soluble azo pigment, an insoluble azo pigment, a condensed azo pigment, a metal phthalocyanine pigment, a metal-free phthalocyanine pigment, a quinacridone pigment, a perylene pigment, perinone pigment, an isoindolinone pigment, an isoindoline pigment, a dioxazine pigment, a thioindigo pigment, an anthraquinone-based pigment, a quinophthalone pigment, a metal complex pigment, a diketopyrrolopyrrole pigment, a carbon black pigment, and other polycyclic pigments can be used. In the invention, inorganic pigments can also be used, and for example, inorganic extender pigments such as carbonate lime powder, precipitated calcium carbonate, gypsum, clay (China Clay), silica powder, diatomaceous earth, talc, kaolin, alumina white, barium sulfate, aluminum stearate, magnesium carbonate, baryte powder, and polishing powder, silicone, or glass beads are used, in addition to inorganic colored pigments such as titanium oxide, clayite, and zinc flower. The amount of these pigments mixed depends on the kinds of the desired printing ink, and is normally preferably in a range of 5 to 55 parts by mass in 100 parts by mass of the printing ink.

The gelling agent is used for adjusting viscoelasticity for the printing ink, and examples thereof include an organoaluminum compound, an organic titanate compound, an organozinc compound, and an organo-calcium compound. The gelling agents may be used alone or in combination of two or more kinds thereof. Among these, the organoaluminum compound is preferable, and examples of the organoaluminum compound include aluminum alcoholate and aluminum chelate compounds. In addition, examples of the aluminum chelate compound include aluminum diisopropoxide monoethyl acetoacetate, aluminum di-n-butoxide monomethyl acetoacetate, aluminum di-n-butoxide monoethyl acetoacetate, aluminum di-i-butoxide monomethyl acetoacetate, aluminum di-sec-butoxide monoethyl acetoacetate, aluminum tris(acetylacetonate), aluminum tris(ethyl acetoacetonate), and aluminum mono-acetylacetonate bis (ethyl acetoacetonate). The amount of the gelling agent added depends on the kinds of the desired printing ink, and is normally in a range of 0.1 to 5 parts by mass in 100 parts by mass of the printing ink.

The surface modifier is added in order to improve abrasion resistance, blocking preventing properties, sliding properties, and scratch preventing properties of an ink coating film, and examples thereof include natural wax such as carnauba wax, wood wax, lanolin, montan wax, paraffin wax, or microcrystalline wax; and synthesis wax such as Fischer-Tropsch wax, polyethylene wax, polypropylene wax, polytetrafluoroethylene wax, polyamide wax, or a silicone compound. The amount of the surface modifier mixed depends on the kinds of the desired printing ink, and is normally preferably in a range of 0.1 to 7.0 parts by mass in 100 parts by mass of the printing ink.

The drying inhibitor is added in order to improve storage stability of the printing ink and prevent skinning, and examples thereof include hydroquinone, methoquinone, and tert-butyl hydroquinone. The amount of the drying inhibitor mixed depends on the kinds of the desired printing ink, and is normally in a range of 0.01 to 5 parts by mass in 100 parts by mass of the printing ink.

Examples of the vegetable oil include monoester of the vegetable oil fatty acid such as linseed oil fatty acid methyl, soybean oil fatty acid methyl, linseed oil fatty acid ethyl, soybean oil fatty acid ethyl, linseed oil fatty acid propyl, soybean oil fatty acid propyl, linseed oil fatty acid butyl, or soybean oil fatty acid butyl, in addition to vegetable oil such as linseed oil, tung oil, rice oil, safflower oil, soybean oil, tall oil, rapeseed oil, palm oil, castor oil, or coconut oil and fat, and recycled vegetable oil obtained by being subjected to a recycling treatment after using these vegetable oils for food processing. These may be used alone or in combination of two or more kinds thereof. Among these, the vegetable oil including an unsaturated bond in a molecule such as linseed oil, tung oil, or soybean oil is preferable, from a viewpoint of producing a printing ink having excellent drying properties, and soybean oil or recycled oil thereof is more preferable, from a viewpoint of small environmental loads.

Examples of the organic solvent include "Spindle Oil No. 1", "Solvent No. 3", "Solvent No. 4", "Solvent No. 5", "Solvent No. 6", "Naphtesol H", and "Alkene 56NT" manufactured by JXTG Nippon Oil & Energy Corporation; "Diadol 13" and "Dialen 168" manufactured by Mitsubishi Chemical Corporation; "F OXOCOL" and "F OXOCOL 180" manufactured by NISSAN CHEMICAL INDUSTRIES, Ltd.; "AF Solvent No. 4", "AF Solvent No. 5", "AF Solvent No. 6", And "AF Solvent No. 7" manufactured by JXTG Nippon Oil & Energy Corporation; D-SOL solvent "Solvent H" manufactured by COPYRIGHT ISU EXACHEM.; "N-Paraffin C14-C18" manufactured by COPYRIGHT ISU EXACHEM.; "Supersol LA35" and "Supersol LA38" manufactured by Idemitsu Kosan Co., Ltd.; "Exxsol D80", "Exxsol D110", "Exxsol D120", "Exxsol D130", "Exxsol D160", "Exxsol D100K", "Exxsol D120K", "Exxsol D130K", "Exxsol D280", "Exxsol D300", and "Exxsol D320" manufactured by EXXON Chemical Co., Ltd.; "Magiesol 40", "Magiesol 44", "Magiesol 47", "Magiesol 52", and "Magiesol 60" manufactured by Magie Brothers Oil Company.

The amount of the vegetable oil or the organic solvent added depends on the kinds of the desired printing ink, and is normally in a range of 20 to 80 parts by mass in 100 parts by mass of the printing ink.

As a method of preparing the printing ink, for example, a method of milling a mixture of the oxidatively polymerizable unsaturated resin, the pigment, the vegetable oil, the organic solvent, and various additives by an ink mill such as three-roll ink mill is used. The curing accelerator for an oxidatively polymerizable unsaturated resin of the invention may be added at the time of the milling or may be added after the milling. In addition, the curing accelerator for an oxidatively polymerizable unsaturated resin may be added as the curing accelerator for an oxidatively polymerizable unsaturated resin obtained by mixing the quinolinol compound (A) and the manganese salt or cobalt salt (B) in advance, or may be mixed separately from the quinolinol compound (A) and the manganese salt or cobalt salt (B). In a case of using a rosin-modified phenol resin having particularly high versatility as the oxidatively polymerizable unsaturated resin, a method of obtaining a varnish of the rosin-modified phenol resin, the vegetable oil, the organic solvent, and the gelling agent in advance, and milling the mixture of the obtained varnish, the pigment, the vegetable oil, the organic solvent, and various additives by an ink mill such as a three-roll ink mill may be used.

A case of using the curing accelerator for an oxidatively polymerizable unsaturated resin of the invention for the coating material will be described. The coating material includes a pigment, a pigment dispersing agent, a drying inhibitor, a surface modifier, an ultraviolet absorber, a defoaming agent, a thickener, an anti-settling agent, vegetable oil, or various organic solvents, in addition to the curing accelerator for an oxidatively polymerizable unsaturated resin and the oxidatively polymerizable unsaturated resin. A mixing ratio of each component or the kinds of mixtures is suitably adjusted depending on the purpose or the desired performance of the coating material.

The amount of the curing accelerator for an oxidatively polymerizable unsaturated resin mixed in the coating material is preferably in a range of 0.001 to 5 parts by mass in 100 parts by mass of the printing ink, from viewpoints of realizing a coating material which has a short drying time and of which skinning hardly occurs.

As described above, examples of the oxidatively polymerizable unsaturated resin used for the coating material include an alkyd resin, an unsaturated group-containing urethane resin, and an unsaturated group-containing epoxy resin. The alkyd resin having particularly high versatility among these is a kind of polyester resin in which a polybasic acid compound, a polyhydric alcohol compound, and an oil fatty acid are main raw material components.

As the polybasic acid compound, for example, dibasic acids such as a phthalic anhydride, an isophthalic acid, a terephthalic acid, a tetrahydrophthalic anhydride, a hexahydrophthalic anhydride, a succinic acid, a fumaric acid, an adipic acid, a sebacic acid, and a maleic anhydride; and lower alkyl esterified material of these acids are mainly used. In addition, tri- or higher valent polybasic acids such as a trimellitic anhydride, a methylcyclohexene tricarboxylic acid, or a pyromellitic anhydride; a sulfophthalic acid, a sulfoisophthalic acid, and ammonium salt, sodium salt, or lower alkyl esterified material of these acids can be used, if necessary. Further, as an acid component, a monobasic acid such as a benzoic acid, a crotonic acid, or a p-t-butylbenzoic acid can be used in combination in order to adjust a molecular weight or the like.

Examples of the polyhydric alcohol compound include dihydric alcohol such as ethylene glycol, diethylene glycol, propylene glycol, 1,4-butanediol, neopentyl glycol, 3-methylpentanediol, 1,4-hexanediol, and 1,6-hexanediol. In addition, tri- or higher polyhydric alcohol such as glycerin, trimethylolethane, trimethylolpropane, or pentaerythritol; and polyhydric alcohol including a polyoxyethylene group can be used in combination, if necessary. These polyhydric alcohols can be used alone or in combination of two or more kinds thereof. In addition, a part of the acid component and the alcohol component can also be substituted with a dimethylolpropionic acid, an oxypivalic acid, or a paraoxybenzoic acid; lower alkyl ester of these acids; or an oxy acid component such as lactones such as ε-caprolactone.

Examples of the oil fatty acid include a coconut oil fatty acid, a soybean oil fatty acid, a linseed oil fatty acid, a safflower oil fatty acid, a tall oil fatty acid, a dehydrated castor oil fatty acid, and a tung oil fatty acid.

In addition, an epoxy-modified alkyd resin prepared by using an epoxy compound for a part of the raw materials, or a vinyl-modified alkyd resin obtained by graft polymerization with a vinyl monomer such as styrene or (meth)acrylic acid ester can also be used. Further, a polyester resin (hereinafter, abbreviated as "recycled PES") which uses terephthalic acid as a main raw material and is recycled from waste and the like generated in a case of manufacturing polyester products (films, fiber, car components, electronic components, and the like) of polyethylene terephthalate collected for recycling of resources (for example, PET bottles), polyethylene terephthalate as industrial waste, polyethylene terephthalate or polybutylene terephthalate prepared by using terephthalic acid as a main raw material, is used. A recycled PES-modified alkyd resin obtained by dissolving this recycled PES in a mixture of the alcohol component and the polybasic acid component, and allowing depolymerization and esterification can be also used.

Examples of the pigment include an inorganic pigment such as a titanium dioxide, an iron oxide, a cadmium sulfide, a calcium carbonate, a barium carbonate, a barium sulfate, clay, talc, chrome yellow, or carbon black; and an organic pigment such as an azo-based organic pigment, a diazo-based organic pigment, a condensed azo-based organic pigment, a thioindigo-based organic pigment, an indanthrone-based organic pigment, a quinacridone-based organic pigment, an anthraquinone-based organic pigment, a benzimidazolone-based organic pigment, a perylene-based organic pigment, a perinone-based organic pigment, a phthalocyanine-based organic pigment, a halogenated phthalocyanine-based organic pigment, an anthrapyridine-based organic pigment, or a dioxazine-based organic pigment. These may be used alone or in combination of two or more kinds thereof. The amount of these pigments mixed depends on the purpose or the desired performance of the coating material, and is normally preferably in a range of 20 to 70 parts by mass in 100 parts by mass of the coating material.

The drying inhibitor is added in order to improve storage stability of the coating material and prevent skinning, and examples thereof include hydroquinone, methoquinone, and tert-butyl hydroquinone. The amount of the drying inhibitor mixed depends on the purpose or the desired performance of the coating material, and is normally in a range of 0.01 to 5 parts by mass in 100 parts by mass of the coating material.

Examples of the organic solvent include "Spindle Oil No. 1", "Solvent No. 3", "Solvent No. 4", "Solvent No. 5", "Solvent No. 6", "Naphtesol H", and "Alkene 56NT" manufactured by JXTG Nippon Oil & Energy Corporation; "Diadol 13" and "Dialen 168" manufactured by Mitsubishi Chemical Corporation; "F OXOCOL" and "F OXOCOL 180" manufactured by NISSAN CHEMICAL INDUSTRIES, Ltd.; "AF Solvent No. 4", "AF Solvent No. 5", "AF Solvent No. 6", and "AF Solvent No. 7" manufactured by JXTG Nippon Oil & Energy Corporation; D-SOL solvent "Solvent H" manufactured by COPYRIGHT ISU EXACHEM.; "N-Paraffin C14-C18" manufactured by COPYRIGHT ISU EXACHEM.; "Supersol LA35" and "Supersol LA38" manufactured by Idemitsu Kosan Co., Ltd.; "Exxsol D80", "Exxsol D110", "Exxsol D120", "Exxsol D130", "Exxsol D160", "Exxsol D100K", "Exxsol D120K", "Exxsol D130K", "Exxsol D280", "Exxsol D300", and "Exxsol D320" manufactured by EXXON Chemical Co., Ltd.; "Magiesol 40", "Magiesol 44", "Magiesol 47", "Magiesol 52", and "Magiesol 60" manufactured by Magie Brothers Oil Company, in addition to a hydrocarbon-based solvent such as toluene, xylene, heptane, hexane, or mineral spirit, an alcohol-based solvent such as methanol, ethanol, propanol, or cyclohexanol, a ketone-based solvent such as methyl ethyl ketone, methyl isobutyl ketone, or cyclohexanone, and an ether-based solvent such as propyl ether, methyl cellosolve, cellosolve, butyl cellosolve, or methyl carbitol. The amount of the organic solvent added depends on the purpose or the desired performance of the coating material, and is normally in a range of 20 to 80 parts by mass in 100 parts by mass of the coating material.

As a method of preparing the coating material, for example, a method of mixing a mixture of the oxidatively polymerizable unsaturated resin, the pigment, the organic solvent, and various additives by various mixers such as a paint shaker is used. The curing accelerator for an oxidatively polymerizable unsaturated resin of the invention may be added at the time of this mixing or after the mixing. In addition, as described above, the curing accelerator for an oxidatively polymerizable unsaturated resin may be added as the curing accelerator for an oxidatively polymerizable unsaturated resin obtained by mixing the quinolinol compound (A) and the manganese salt or cobalt salt (B) in advance, or may be mixed separately from the quinolinol compound (A) and the manganese salt or cobalt salt (B).

The coating material of the invention can be applied on a material to be coated, dried and cured by usual methods to obtain a coating film. Here, as a base material (material to be coated) capable of being coated with the coating material of the invention, steel or the like is used, for example. In addition, as drying conditions (curing conditions) after the coating, room-temperature drying is used. Further, the coating material of the invention is particularly useful for a coating material for thick coating, because the coating material of the invention can exhibit excellent curing properties, even in a case of a thick coating film. Specifically, a film thickness of the cured coating film can be in a range of 1 to 500 μm. Accordingly, the coating material of the invention is useful as coating materials for building.

EXAMPLES

Hereinafter, the invention will be described more specifically with reference to specific examples. In the examples, "part" and "%" are based on mass, unless otherwise noted.

Comparative Preparation Examples 1 and 2

Preparation of Curing Accelerators for Oxidatively Polymerizable Unsaturated Resin (1') and (2')

Components were mixed according to proportions shown in Table 1, thereby obtaining accelerators for oxidatively polymerizable unsaturated resin (1') and (2').

TABLE 1

| | Curing accelerator for oxidatively polymerizable unsaturated resin | | | | | | | | |
|---|---|---|---|---|---|---|---|---|---|
| | (1) | (2) | (3) | (4) | (5) | (6) | (7) | (1') | (2') |
| Manganese octylate soybean oil solution [parts by mass] | 100 | 100 | 100 | 100 | 100 | | | 100 | 100 |
| Manganese (II) chloride tetrahydrate [parts by mass] | | | | | | 100 | | | |
| Cobalt octylate soybean oil solution [parts by mass] | | | | | | | 100 | | |
| 8-Quinolinol [parts by mass] | 13 | 13 | 26 | 6.5 | | 72.2 | 25 | | |
| 5-Chloro-8-quinolinol [parts by mass] | | | | | 16.5 | | | | |
| 2,2'-Bipyridyl [parts by mass] | | | | | | | | 14.2 | |
| 2-[[(2-dimethylamino) ethyl] methylamino] ethanol [parts by mass] | | | | | | | | | 13.3 |
| Soybean oil [parts by mass] | 387 | | 374 | 394 | 384 | | 875 | 386 | 387 |
| Ethanol [parts by mass] | | 387 | | | | 2605 | | | |
| Metal content in curing accelerator [% by mass] Manganese | 1 | 1 | 1 | 1 | 1 | 1 | — | 1 | 1 |
| Cobalt | — | — | — | — | — | — | 1 | — | — |

The MS spectrum was measured by using a double focusing mass spectrometer "AX505H (FD505H)" manufactured by JEOL, Ltd.

Example 1

Preparation of Curing Accelerator for Oxidatively Polymerizable Unsaturated Resin (1)

100 parts of mass of a manganese octylate soybean oil solution ("DICNATE2505SB" manufactured by DIC Corporation, manganese content of 5% by mass), 13 parts by mass of 8-quinolinol ("8-Hydroxyquinoline" manufactured by Tokyo Chemical Industry Co., Ltd.), and 387 parts by mass of soybean oil ("soybean salad oil (S)" manufactured by The Nisshin OilliO Group, Ltd.) were mixed and a curing accelerator for an oxidatively polymerizable unsaturated resin (1) was obtained. In the MS spectrum of the curing accelerator for an oxidatively polymerizable unsaturated resin (1), a peak assumed as a peak of a complex in which a 8-quinolinol ion and an octylic acid ion were respectively coordinated with manganese (II) ion, a peak assumed as a peak of a complex in which two 8-quinolinol ions were coordinated with manganese (II) ion, and a peak assumed as a peak of a complex in which three 8-quinolinol ions were coordinated with manganese (III) ion were confirmed at a mass-to-charge ratio (m/z) of 342.4, m/z of 343.2, and m/z of 487.3, respectively.

Examples 2 to 7

Preparation of Curing Accelerators for Oxidatively Polymerizable Unsaturated Resin (2) to (7)

Components were mixed according to proportions shown in Table 1, thereby obtaining accelerators for oxidatively polymerizable unsaturated resin (2) to (7).

Note for Table 1

Manganese (II) chloride tetrahydrate: "Manganese (II) chloride tetrahydrate" manufactured by Wako Pure Chemical Industries, Ltd., manganese content of 28% by mass Cobalt octylate soybean oil solution: "DICNATE210SB" manufactured by DIC Corporation, cobalt content of 10% by mass, 5-Chloro-8-quinolinol: "5-Chloro-8-hydroxyquinoline" manufactured by Tokyo Chemical Industry Co., Ltd.

2,2'-Bipyridyl: "2,2'-Bipyridyl" manufactured by Tokyo Chemical Industry Co., Ltd.

2-[[(2-Dimethylamino) ethyl] methylamino] ethanol: "2-[[(2-Dimethylamino) ethyl] methylamino] ethanol" manufactured by Tokyo Chemical Industry Co., Ltd.

Ethanol: "Ethanol (99.5)" manufactured by Wako Pure Chemical Industries, Ltd.

Example 8

Preparation and Evaluation of Coating Material (1)
Preparation of Coating Material (1)

100 parts by mass of a titanium white pigment ("TIPAQUE CR-50" manufactured by ISHIHARA SANGYO KAISHA, LTD.), 40 parts by mass of calcium carbonate ("NS #100" manufactured by NITTO FUNKA KOGYO K.K.), 240 parts by mass of an alkyd resin ("BECKOSOL P-470-70" manufactured by DIC Corporation), and 20 parts by mass of mineral spirit ("Mineral Spirit A" manufactured by JXTG Nippon Oil & Energy Corporation) were kneaded with a paint shaker, thereby obtaining a base coating material.

0.2 parts by mass of an anti-skinning agent ("Methyl ethyl ketoxime" manufactured by Ube Industries, Ltd.), 0.5 parts by mass of the curing accelerator for an oxidatively polymerizable unsaturated resin (1) obtained in Example 1, and 0.6 parts by mass of a zirconium drier were added to 100 parts by mass of the obtained base coating material, thereby preparing a coating material (1).

Evaluation of Coating Material (1)

Surface curing properties and internal curing properties of the coating material were evaluated with the following points. The results are shown in Table 2.

Surface Curing Properties of Coating Material

A test was performed in a constant temperature and humidity room (23±2° C., 50±5% RH). The coating material (1) obtained above was applied on a glass plate with an applicator of 152 μm. After the coating, the time until the coating material is not attached to the fingertip, in a case where the center of the coated surface is lightly touched by the fingertip was measured.

Internal Curing Properties of Coating Material

A test was performed in a constant temperature and humidity room (23±2° C., 50±5% RH). The coating material (1) obtained above was applied on a glass plate with an applicator of 76 μm. After the coating, the time until scratches made by pointers of a drying time recorder ("Type No. 404" manufactured by TaiyuKizai Co., Ltd.) are not observed due to complete drying of the coating material was measured.

Examples 9 to 19

Preparation and Evaluation of Coating Materials (2) to (12)

Components were mixed according to proportions shown in Table 2, thereby obtaining coating materials (2) to (12). The surface curing properties and internal curing properties of the coating material were evaluated in the same manner as in Example 1. The results are shown in Table 2.

Comparative Examples 1 to 5

Preparation and Evaluation of Coating Materials (1') to (5')

Components were mixed according to proportions shown in Table 3, thereby obtaining coating materials (1') to (5'). The surface curing properties and internal curing properties of the coating material were evaluated. The results are shown in Table 3.

TABLE 2

| Coating material | | (1) | (2) | (3) | (4) | (5) | (6) | (7) | (8) | (9) | (10) | (11) | (12) |
|---|---|---|---|---|---|---|---|---|---|---|---|---|---|
| Base coating material [parts by mass] | | 100 | 100 | 100 | 100 | 100 | 100 | 100 | 100 | 100 | 100 | 100 | 100 |
| Anti-skinning agent [parts by mass] | | 0.2 | 0.2 | 0.2 | 0.2 | 0.2 | 0.2 | 0.2 | 0.2 | 0.2 | 0.2 | 0.2 | 0.2 |
| Curing accelerator for an oxidatively polymerizable unsaturated resin [parts by mass] | (1) | 0.5 | 0.5 | 0.5 | 0.2 | 1 | | | | | | | |
| | (2) | | | | | | 0.5 | | | | | | |
| | (3) | | | | | | | 0.5 | | | | | |
| | (4) | | | | | | | | 0.5 | | | | |
| | (5) | | | | | | | | | 0.5 | | | |
| | (6) | | | | | | | | | | 0.5 | | |
| | (7) | | | | | | | | | | | | 0.5 |
| Manganese octylate soybean oil solution [parts by mass] | | | | | | | | | | | | 0.1 | |
| 8-Quinolinol [parts by mass] | | | | | | | | | | | | 0.02 | |
| Zirconium drier [parts by mass] | | 0.6 | | | 0.6 | 0.6 | 0.6 | 0.6 | 0.6 | 0.6 | 0.6 | 0.6 | 0.6 |
| Calcium drier [parts by mass] | | | | 1.8 | | | | | | | | | |
| Metal content [% by mass] | Manganese | 0.005 | 0.005 | 0.005 | 0.002 | 0.010 | 0.005 | 0.005 | 0.005 | 0.005 | 0.005 | 0.005 | — |
| | Cobalt | — | — | — | — | — | — | — | — | — | — | — | 0.005 |
| Surface curing properties [time] | | 2.8 | 3.0 | 1.9 | 1.9 | 3.2 | 2.7 | 1.8 | 2.8 | 2.7 | 2.9 | 1.8 | 2.9 |
| Internal curing properties [time] | | 4.4 | 5.2 | 3.6 | 7.6 | 8.3 | 4.5 | 3.8 | 5.8 | 4.9 | 4.6 | 5.1 | 4.7 |

TABLE 3

| coating material | | (1') | (2') | (3') | (4') | (5') |
|---|---|---|---|---|---|---|
| Base coating material [parts by mass] | | 100 | 100 | 100 | 100 | 100 |
| Anti-skinning agent [parts by mass] | | 0.2 | 0.2 | 0.2 | 0.2 | 0.2 |
| Curing accelerator for an oxidatively polymerizable unsaturated resin [parts by mass] | (1') | 0.5 | | | | |
| | (2') | | 0.5 | | | |
| Manganese octylate soybean oil solution [parts by mass] | | | | 0.1 | | |
| Cobalt octylate soybean oil solution [parts by mass] | | | | | 0.25 | 0.05 |
| Zirconium drier [parts by mass] | | 0.6 | 0.6 | 0.6 | 0.6 | 0.6 |
| Metal content [% by mass] | Manganese | 0.005 | 0.005 | 0.005 | — | — |
| | Cobalt | — | — | — | 0.025 | 0.005 |
| Surface curing properties [time] | | 4.3 | 4.7 | 12.0 | 3.6 | 3.4 |
| Internal curing properties [time] | | 8.4 | 9.0 | 15.3 | 9.4 | 10.3 |

Note for Tables 2 and 3

Manganese octylate soybean oil solution: "DICNATE2505SB" manufactured by DIC Corporation, manganese content of 5% by mass Cobalt octylate soybean oil solution: "DICNATE210SB" manufactured by DIC Corporation, Cobalt content of 10% by mass 8-Quinolinol: "8-Hydroxyquinoline" manufactured by Tokyo Chemical Industry Co., Ltd.

Zirconium drier: "12% Zr-OCTOATE" manufactured by DIC Corporation, zirconium content of 12% by mass Calcium drier: "Ca-OCTOATE 4%" manufactured by DIC Corporation, calcium content of 4% by mass Example 20

Preparation and Evaluation of Printing Ink (1)
Preparation of Printing Ink (1)

100 parts by mass of a rosin-modified phenol resin ("BECKACITE F-7310" manufactured by DIC Corporation) and 100 parts by mass of soybean oil ("soybean salad oil (S)" manufactured by The Nisshin OilliO Group, Ltd.) were heated at 210° C. for 1 hour, 47.5 parts by mass of an organic solvent ("AF Solvent No. 6" manufactured by JXTG Nippon Oil & Energy Corporation) and 2.5 parts by mass of aluminum chelate ("Chelope (S)" manufactured by Hope Chemical Co., Ltd.) were added thereto and heated at 150° C. for 1 hour, thereby preparing a varnish for a printing ink.

100 parts by mass of the varnish for a printing ink obtained above, 20 parts by mass of a phthalocyanine blue pigment ("FASTOGEN BLUE TGR-L" manufactured by DIC Corporation), 25 parts by mass of soybean oil ("soybean salad oil (S)" manufactured by The Nisshin OilliO Group, Ltd.), and 25 parts by mass of an organic solvent ("AF Solvent No. 6" manufactured by JXTG Nippon Oil & Energy Corporation) were kneaded with a three-roll ink mill, thereby obtaining a base ink.

2 parts by mass of the curing accelerator for an oxidatively polymerizable unsaturated resin (1) obtained in Example 1 was added to 100 parts by mass of the obtained base ink, thereby preparing a printing ink (1).

Evaluation of Printing Ink (1)

Surface curing properties and internal curing properties of the printing ink were evaluated with the following points. The results are shown in Table 4.

Surface Curing Properties of Printing Ink

A test was performed in a constant temperature and humidity room (23±2° C., 50±5% RH). The printing ink (1) obtained above was applied on parchment paper with an applicator of 10 μm. After the coating, the time until the ink is not attached to the fingertip, in a case where the center of the coated surface is lightly touched by the fingertip was measured.

Internal Curing Properties of Printing Ink

A test was performed in a constant temperature and humidity room (23±2° C., 50±5% RH). The printing ink (1) obtained above was applied on a glass plate with an applicator of 38 μm. After the coating, the time until scratches made by pointers of a drying time recorder ("Type No. 404" manufactured by TaiyuKizai Co., Ltd.) are not observed due to complete drying of the ink was measured.

Examples 21 to 24

Manufacturing and Evaluation of Printing Inks (2) to (5)

Components were mixed according to proportions shown in Table 4, and printing inks (2) to (5) were obtained. The surface curing properties and internal curing properties of the printing ink were evaluated in the same manner as in Example 20. The results are shown in Table 4.

TABLE 4

| Printing ink | | (1) | (2) | (3) | (4) | (5) |
|---|---|---|---|---|---|---|
| Base ink [parts by mass] | | 100 | 100 | 100 | 100 | 100 |
| Curing accelerator for an | (1) | 2 | 4 | | | |
| oxidatively polymerizable | (3) | | | 2 | | |
| unsaturated resin [parts by mass] | (4) | | | | 2 | |
| Manganese octylate soybean oil solution [parts by mass] | | | | | | 0.4 |
| 8-Quinolinol [parts by mass] | | | | | | 0.08 |
| Metal content [% by mass] | Manganese | 0.02 | 0.04 | 0.02 | 0.02 | 0.02 |
| Surface curing properties [time] | | 7.0 | 5.0 | 6.8 | 7.5 | 6.9 |
| Internal curing properties [time] | | 16.9 | 15.8 | 17.1 | 18.0 | 17.0 |

Note for Table 4

Manganese octylate soybean oil solution: "DICNATE2505SB" manufactured by DIC Corporation, manganese content of 5% by mass 8-Quinolinol: "8-Hydroxyquinoline" manufactured by Tokyo Chemical Industry Co., Ltd.

The invention claimed is:

1. A curing accelerator for an oxidatively polymerizable unsaturated resin, comprising:
   a quinolinol compound (A) represented by Structural Formula (2);
   a manganese salt (B); and
   a metal salt (C) other than the manganese salt (B):

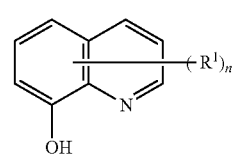

(2)

wherein $R^1$ is any of a hydrogen atom, a hydrocarbon group having 1 to 6 carbon atoms, an alkoxy group having 1 to 6 carbon atoms, a hydroxyl group, an amino group, a nitro group, a nitroso group, a sulfo group, and a halogen atom, and n is an integer of 1 to 6;

wherein the manganese salt (B) is represented by Structural Formula (B-1) or (B-2):

$M(X)_2$      (B-1)

MY      (B-2)

wherein,

M is $Mn^{2+}$,

X is $F^-$, $Cl^-$, $Br^-$, $I^-$, $PF_6^-$, $SbF_6^-$, $AsF_6^-$, $BF_4^-$, $B(C_6F_5)_4^-$, $ClO_4^-$, $ClO_3^-$, $CO_2^-$, $ClO^-$, $H_2PO_4^-$, $H_2PO_3^-$, $H_2PO_2^-$, $HCO_3^-$, $NO_3^-$, $NO_2^-$, $(CH_3CO)_2CH^-$, octylate$^-$, neodecanoate$^-$, isononanoate$^-$, an anion of a tung oil fatty acid, an anion of a linseed oil fatty acid, an anion of a soybean oil fatty acid, resinate$^-$ or an anion of a tall oil fatty acid, and Y is any of $O^{2-}$, $S^{2-}$, $SO_4^{2-}$, $SO_3^{2-}$, and $CO_3^{2-}$;

wherein the metal salt (C) is a fatty acid salt, and the amount of fatty acid in the metal salt (C) is in a range of 1.0 to 4.0 mol with respect to 1 mol of the metal atoms; and wherein the amount of the metal used in the metal salt (C) is 1 to 100 parts by mass with respect to 1 part by mass of manganese metal in the manganese salt.

2. A curable resin composition comprising:

the curing accelerator for an oxidatively polymerizable unsaturated resin according to claim 1; and an oxidatively polymerizable unsaturated resin.

3. The curable resin composition according to claim 2, which is a printing ink or a coating material.

\* \* \* \* \*